United States Patent
Ellingboe

[15] 3,637,994
[45] Jan. 25, 1972

[54] ACTIVE ELECTRICAL CARD DEVICE

[72] Inventor: Jules K. Ellingboe, Palos Verdes Peninsula, Calif.

[73] Assignee: TRW Inc., Redondo Beach, Calif.

[22] Filed: Oct. 19, 1970

[21] Appl. No.: 82,202

[63] Continuation of Ser. No. 678,607, Oct. 29, 1967, abandoned

[52] U.S. Cl. .....................................235/61.12 N, 307/303
[51] Int. Cl. ...................................G06k 19/00, H03k 23/22
[58] Field of Search.............235/61.12 R, 61.12 N, 61.12 C, 235/61.12 M; 340/149 A; 194/4; 179/2 CA, 6.3 CC; 283/6, 7; 186/1; 40/2.2; 307/303; 330/38 M

[56] References Cited

UNITED STATES PATENTS

| | | | |
|---|---|---|---|
| 2,774,060 | 12/1956 | Thompson | 235/61.12 X |
| 3,036,765 | 5/1962 | Jones et al. | 250/219 X |
| 3,134,254 | 5/1964 | Richard | 235/61.11 D |
| 3,431,235 | 3/1969 | Lubowitz | 260/2 X |

OTHER PUBLICATIONS

Signetics, Electronic Design, 26 April 1966, page 7.

*Primary Examiner*—Maynard R. Wilbur
*Assistant Examiner*—Thomas J. Sloyan
*Attorney*—Daniel T. Anderson, Gerald Singer and Harry I. Jacobs

[57] ABSTRACT

This invention relates to data-processing and information-handling equipment, and more particularly, to a card of the type now commonly used as a credit card but having therein circuits including active electrical components connected to terminals adapted to be mated detachably to contacts in larger stationary equipment such as computer input devices, accounting machines, computer-controlled vending machines, coin telephones, etc. The active electrical components are preferably in the form of microelectronic information-handling circuits contained inside the plastic or other material from which the card is made so as to permit the construction of unique identification systems which are not readily counterfeitable by external analytical means and to permit the inclusion of information storage and data-processing capability so that the card, when connected to the apparatus by the individual user, becomes an integral part thereof and upon inquiry from the apparatus can respond with the user's identity, account status, current purchase request, and the like. The card is intended for use as a "key card" and for use in automatic verification of identity, accounting, posting, billing, and transfer of funds in order to reduce either the amount of cash which the user is required to carry or the number of checks or other banking or billing transactions which must be manually carried out.

5 Claims, 9 Drawing Figures

PATENTED JAN 25 1972
3,637,994
SHEET 1 OF 2
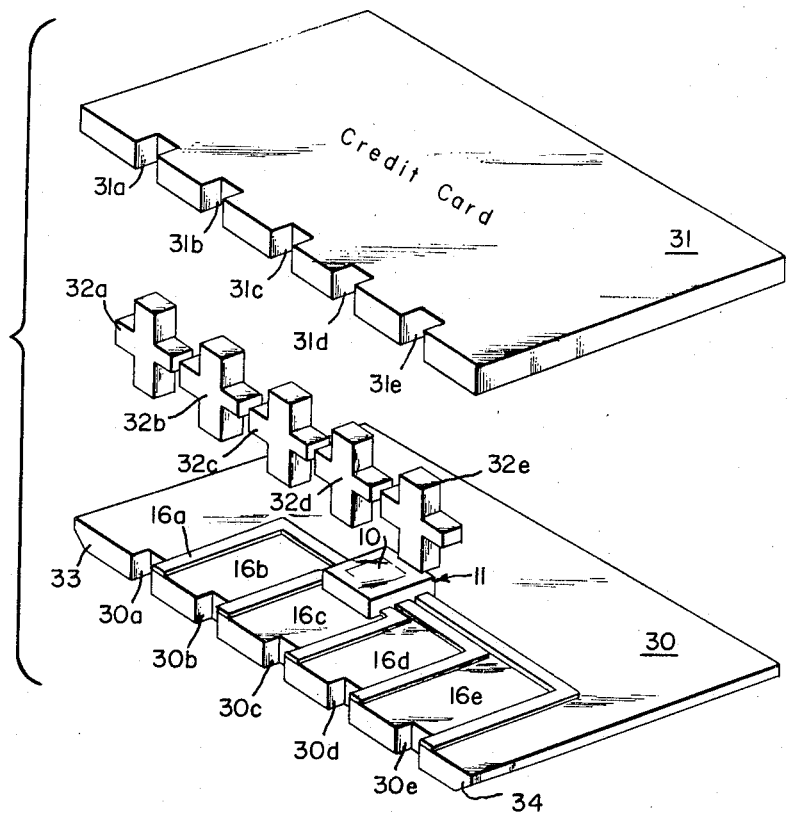
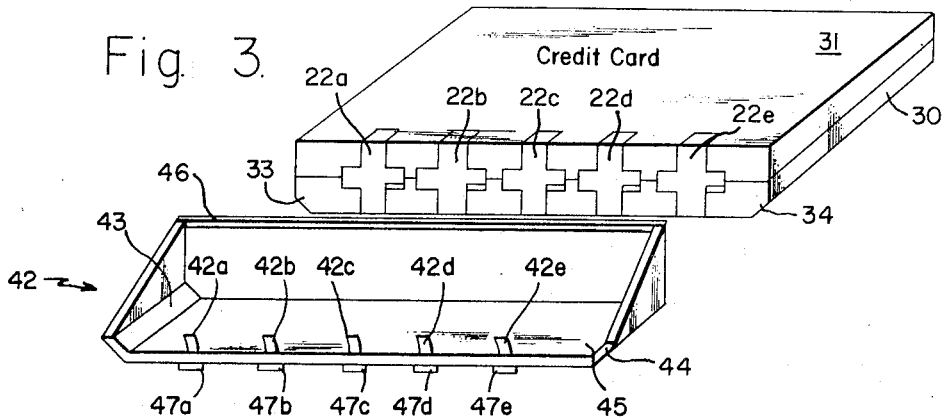
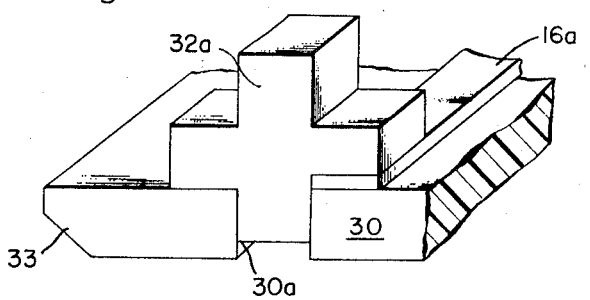
Jules K. Ellingboe
INVENTOR.
BY
Donald C Keaveney
ATTORNEY.

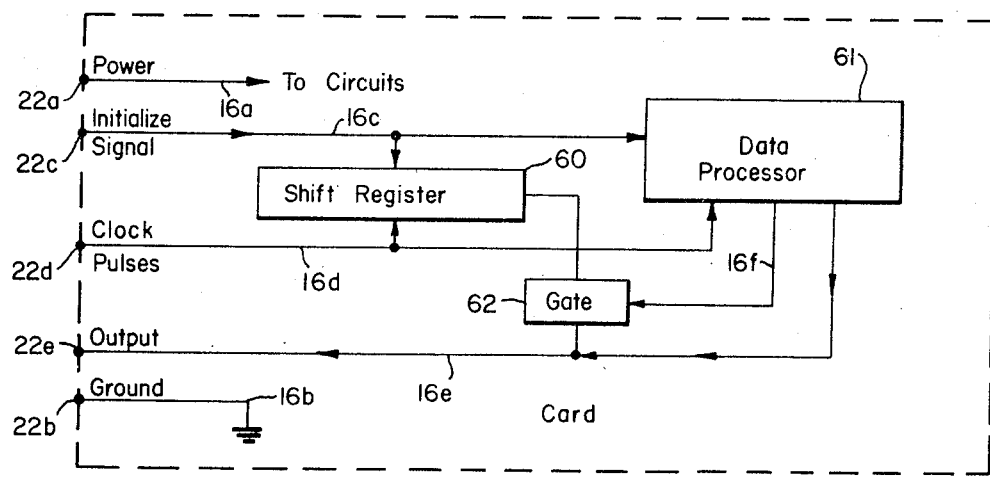
Fig. 6.
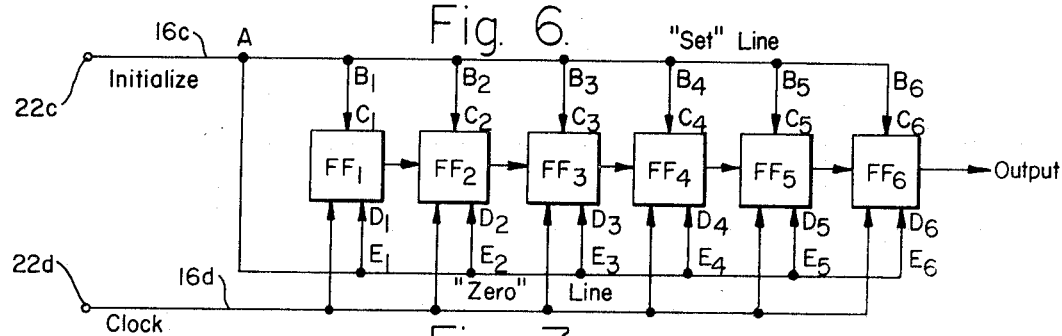
Fig. 7.
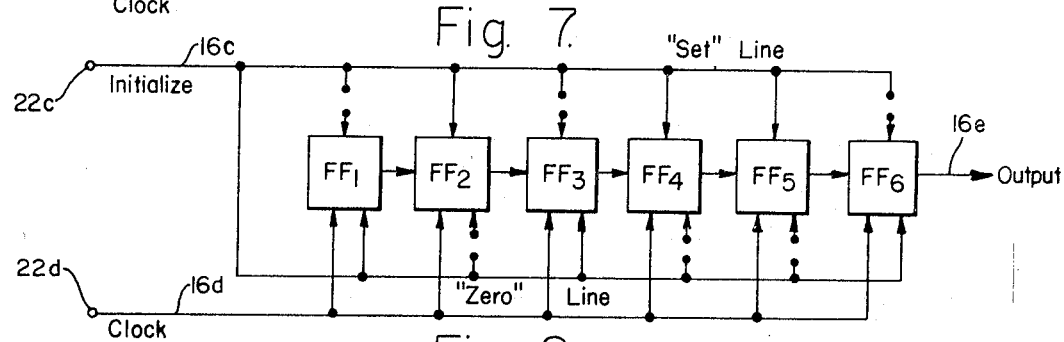
Fig. 8.
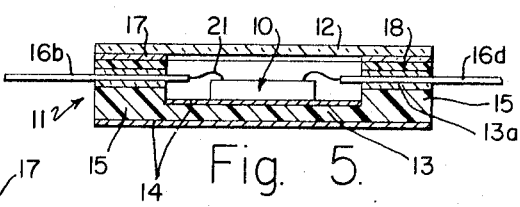
Fig. 4.
Fig. 5.
Fig. 9.

ACTIVE ELECTRICAL CARD DEVICE

This is a continuation of my first filed application filed Oct. 27, 1967, afforded Ser. No. 678,607, and now abandoned.

BACKGROUND OF THE INVENTION

Conventional card identification systems as presently used for credit, key, or other purposes are limited in usefulness both by the large number of manual actions which must occur subsequent to presentation of cards and by the limited complexity of passive magnetic coding. In order to progress toward automatic verification of identity, and if desired, toward simultaneous automatic verification of account status, posting, billing, and transfer of funds, and to allow for the many possible forms of data processing and display associated with automatic systems, the identification card should be an active component of the entire information-processing system. The card should be able to present complete identification in electrical or electromagnetic manner and to respond properly to an automatic inquiry if such is necessary.

No present identification card has the facility to make such a system possible. The "magnetic key card" has a very limited coding potential insufficient for unique identification in very large populations and is furthermore quite easily counterfeited. The same comments apply to any passive electrical network incorporated into an identification card. Standard "credit cards" using only numbers raised on the surface for imprintation on sales slips and the like are, of course, unsuitable for use in any automatic identification system or associated data-processing apparatus.

The card of the present invention may, if desired, include such surface legend, raised characters, signature samples, and the like, but is primarily intended to afford a capability for use in an automatic data-processing system which involves at least the unique identification of the person and may also involve the processing of additional information. Presently available microelectronic circuit fabrication and packaging techniques permits the use of electrically active circuits of sufficient number to provide for a suitable number of unique electrical identifications while still packaging the circuitry into a small enough envelope to be embedded in a card of the credit card type for convenient handling and use. Such a card permits electrical identification and response for any desired data processing in addition to the conventional credit card type of operation. It can be adapted to perform as a credit rating verification system, a key system, a voting-polling or tally system and can be used for process control, billing, posting, ordering, or any combination of the foregoing.

It is thus an object of this invention to provide an active electrical card identification device in a form convenient for carrying and use.

It is a further object of this invention to provide an active electronic or electromagnetic circuit or circuits packaged in a "credit card."

It is a further object of this invention to provide such a device having provisions for immediate automatic data processing in conjunction with use of the card for credit, identification or key purposes.

It is a still further object of this invention to provide a unique identification card which cannot be readily counterfeited solely by use of external measurements and which will thus afford its owner notification of loss or destruction if counterfeiting is attempted.

SUMMARY OF THE INVENTION

The foregoing objects and advantages are achieved by providing one or more semiconductor wafers and/or magnetic core arrays containing the desired microelectronic circuitry, the wafers, for example, being packaged in what is known in the art as a "flat package" which affords rigid support and a hermetic seal for the circuitry. This flat package has the desired number of input and output lead conductors comprising thin conductive ribbons of metal which are welded or otherwise attached to suitably shaped terminal blocks. The flat package with its input and output connectors is then laminated between two suitable sheets of plastic, preferably with the terminal blocks seated in preformed notches on the edges of the plastic sheets so that they become a smooth integral part of one edge of the card. Means are also provided, as by beveling one pair of edges of the card, to insure that the card can be inserted in only one position in a slot in associated equipment with which it is intended to be used. At the back of such a slot, mating contact members for the terminals are provided which may, for example, be in the form of spring finger contacts. One of these contacts, of course, is a power supply, one is a ground, and others may be used for signal input and output, clock pulse trains, and the like. The particular form and complexity of the circuitry contained in the one or more flat packages or otherwise embedded in the card will, of course, be determined by the particular use for which that individual card is intended. The disclosure herein describes, by way of example only, a circuit wherein a single-shift register is used simply to provide a unique identification code in connection with any conventional data-processing circuit. Other specific circuits particularly intended for specialized uses are well known in the art and will be readily apparent to those skilled therein.

BRIEF DESCRIPTION OF THE DRAWINGS

In the drawing, FIG. 1 is an exploded perspective view showing the two laminations from which the card is formed and showing the manner in which the flat package, the leads therefrom, and the terminal blocks are positioned to be interconnected.

FIG. 2 is an enlarged fragmentary view of the left-hand corner of the lower plastic sheet showing the manner in which the first terminal block with a lead welded thereto is positioned in its notch prior to lamination.

FIG. 3 is a perspective view of the completed laminated card showing the manner in which it is intended to be coaligned for insertion into a slot in information-processing apparatus.

FIG. 4 is a perspective view on an enlarged scale of the flat package containing the microelectronic wafer.

FIG. 5 is a sectional view taken on the line 5—5 of FIG. 4.

FIG. 6 is a block diagram showing the general configuration of the electrical circuitry in the card.

FIG. 7 is a detailed block diagram of the identification code shift register shown in FIG. 6 before the shift register is coded.

FIG. 8 is a block diagram of the shift register of FIGS. 6 and 7 after the identification code has been set into the shift register.

FIG. 9 is a schematic plan view of an alternate mating card and slot shape.

DESCRIPTION OF THE PREFERRED EMBODIMENT

Turning now to the drawing, there is shown in FIG. 1 a microelectronic integrated-circuit wafer 10 mounted in a flat package 11. This integrated-circuit wafer 10 and package 11 are shown in greater detail on an enlarged scale in FIGS. 4 and 5. The flat package 11 is generally the type of package disclosed in the copending application of James L. Buie entitled, "Semiconductor Product and Process of Manufacturing Thereof," filed May 15, 1967, Ser. No. 638,361. The integrated circuit formed in the silicon semiconductor wafer 10 may be generally of the type described in the copending application of Norman J. Grannis and Ted Winkler entitled, "Digital Cell for Large Scale Integration," filed Sept. 20, 1967, Ser. No. 669,091. Both of these copending applications are assigned to the same assignor as the present application.

Both the circuitry of the digital cell formed in the silicon wafer 10 and the construction of the flat package will be described in greater detail below, but it will first be noted from FIG. 5 that the silicon wafer 10 is mounted inside the rigid flat package 11 which has a plurality of ribbonlike leads or conductors 16a, 16b, 16c, 16d, and 16e, sealed through insulative material 13a in the sides of the housing 11. These flat leads are connected as by a gold wire 21 to the circuitry on the wafer 10. It will also be noted from FIG. 1 that the package 11 and the flat leads 16a, 16b, 16c, 16d, and 16e are adapted to be placed during manufacture on a flat lower sheet 30 of plastic material. A matching sheet 31 of the same material is placed above the circuit assembly and after completion of this assembly, the two sheets 30 and 31 are heat treated and pressed to laminate the circuitry between them.

It will be noted that each of the sheets 30 and 31 has a plurality of notches along one side thereof. Thus, the sheet 30 is provided with correspondingly positioned registering notches 31a, 31b, 31c, 31d, and 31e. These slots or notches are shaped and dimensioned to receive contact terminal members 32a, 32b, 32c, 32d, and 32e, respectively.

In the assembly process, the leads from the flat package 11 are first welded as by spot welding or resistance welding to the associated terminal member so as to assume the configuration most clearly shown in FIG. 2. In FIG. 2 it will be noted that the terminal member 32a is of generally cross-shape cross section, having been stamped from a sheet of kovar, steel, or other suitable electrically conductive material which has good hardness and wear resistance properties. For cases where extreme wear resistance is desired, the terminal block may comprise a copper core which is first nickel plated, then rhodium plated, then gold flashed.

One arm of the cross-shape member is slightly thinner than the other arm. It can be seen in FIG. 2 that the right-hand arm is thinner than the left-hand arm of the cross by an amount equal to the thickness of the lead ribbon 16a, so that when this lead ribbon is welded to the underside of the cross arm, the two arms become of equal thickness. The assembled lead and terminal member is then placed in the notch 30a of the lower plastic sheet 30. Similarly, the assembled terminals for all other leads are placed in their associated notches, thereby positioning the flat package 11 centrally on the plastic sheet member 30.

As noted, the flat package may be of the type described in the above-identified Buie application which in turn is an improvement over the type of flat package currently available commercially and described, for example, in a book entitled, "Microelectronics," edited by Edward Keonjian and published by the McGraw-Hill Book Company in 1963. On page 298 of that book, FIG. 5-23 shows a similar semiconductor integrated-circuit flat package, the dimensions of which are ⅛ inch wide by ¼ inch long and which is stated on page 299 to be 0.040 inch thick. This is a thickness of approximately 1 millimeter. It is presently preferred to make each of the plastic sheets 30 and 31 before lamination also of a thickness of approximately 1 millimeter so that the final assembled card will have a thickness of about 2 millimeters. Sine the terminal members ultimately extend flush with the upper and lower surfaces of the card, the overall dimension of the cross is also 2 millimeters with each arm having a thickness of 1 millimeter except the inner arm which is thinner by an amount sufficient to compensate for the thickness of the lead 16a.

Of course, it will be understood that the thickness dimension could be reduced by using what is known as a "lid" mount for the wafer. This is simply a thin sheet of metal on which the semiconductor circuitry is formed and is then directly "potted" or laminated. It will also be understood that the lead in conductors could be deposited by printed-circuit techniques directly on the lower sheet 30. The preferred arrangement described, however, gives the circuitry more protection against flexure of this card.

Similarly, the card itself may be made from a wide variety of materials including the thermoplastic materials now used for credit cards. However, in order to achieve greater adhesion of the metal block to the plastic and greater rigidity for a given thickness of plastic material, it is preferred to use an epoxy or, alternatively and preferably, what is known in the art as "Hystl."

Hystl is a trade name for a cyclized, highly cross-linked polydiene resin. The cured resin is characterized as a hard, stiff, chemically stable resin having a high dielectric strength. Additional detailed information relating to the properties and preparation of Hystl may be obtained from U.S. Pat. No. 3,431,235, which is assigned to the same assignee as the present application. As used in this device, an opaquing or coloring agent would preferably be added.

In order to laminate the terminal, conductor, and flat pack assembly between the sheets 30 and 31, the lower sheet 31 is placed in a form while it is in its moldable or flexible state. The outlines of the form or mold, of course, correspond to the desired outline of the card. It will be noted that this outline includes beveled edges 33 and 34 on the lower surface of lower sheet 30. As will be apparent from FIG. 3, these beveled edges are provided so that when they mate with beveled edges in the slot into which the card is adapted to be inserted, they will permit entry of the card into the slot in only the right-side-up position in order to assure that the terminals reach the intended contact point within the slot rather than its reverse or mirror image. That is to say, if the card is inadvertently turned upside down before it is placed in the slot, the terminals 22 will not mate with the intended corresponding spring contact fingers 42a, 42b, 42c, 42d, and 42e in the slot or receptacle structure 42 shown in FIG. 3. Hence, the receptacle is provided with beveled surfaces 43 and 44 adapted to receive the beveled lower edges 33 and 34 of the card but to block the square edges of the upper card 31 in the event that the card in inadvertently turned upside down. Alternatively, as shown in FIG. 9, the slot and the card could be made trapezoidal in form rather than rectangular so that the card could be inserted into the slot in only one position. Thus, in the schematic plan view of FIG. 9, it is apparent that the card with its right-side surface 51 up will mate with the trapezoidal slot 52, whereas if the card is turned over so that its lower side 50 is uppermost, it will not mate with the trapezoidal slot 52. Either the beveled edge or the trapezoidal form is feasible. Any arrangement which assures a unique positioning of the card in its contact or coupled or operative relationship to the slot and at the same time result in a smooth easily handled card structure which will not tear the user's clothing, scratch, cut, abrade, or the like, is of course acceptable.

Returning to FIGS. 1, 2, and 3, after the assembly of the flat pack with its leads and terminal contact members welded thereto has been positioned on the lower sheet 30 so that the lower arms of the cross-shape terminal members seat in the corresponding slots of the sheet 30, the upper sheet 31 is laid over the lower sheet in registry therewith so that the notches 31a, etc., in its edge seat over the upper arms of the cross-shaped contact members. A heating-and-pressing operation is then carried out so that the crossmember is pushed downwardly and seats flush with the bottom surface of the rigid form thereby laminating the upper and lower sheets together and producing the card configuration shown in FIG. 3. During the heating-and-pressing operation, of course, the flexible plastic material flows or gives enough to accommodate the arms of the cross and a percentage of the thickness of the flat package 11 so that in the finished card there is approximately ½ millimeter of plastic material above and below the flat package 11, which itself has a thickness of about 1 millimeter, thereby producing a total card thickness of about 2 millimeters. The lead members 16 are of negligible thickness and could, if desired, even be printed-circuit conductive bands on the lower sheet 31. During the heating and the pressing operation, the plastic material is set and when allowed to cool and cure, it assumes its permanent shape as is well known in the art.

The thickness and material are preferably chosen so that the card has somewhat greater rigidity than is common in conventional credit card thermoplastic devices. Such cards normally range from 1 to 2 millimeters in thickness, and it is preferred to use the thicker end of the accepted range in order to gain the greater rigidity. Also, of course, although many different types of plastic material could be used for the sheets 30 and 31, a suitable choice should be made to insure good adhesion to the contact terminals 22, to provide the desired rigidity and wear characteristics, and to be easily and economically moldable as described herein into a precisely dimensioned shape which will hold its dimensions and fit snugly in the mating slot.

As can be seen in FIG. 3, the card assembly 30–31 is intended to be inserted into a slotted receptacle 42 having a baseplate member 45 with beveled upwardly extending edges 43 and 44 integral with member 45, and slot-defining structure 46 at the forward end thereof. At the rear or inner portion of the receptacle, a plurality of curved spring finger contacts 42a, 42b, 42c, 42d, and 42e are attached to terminal blocks 47a, 47b, 47c, 47d, and 47e which by riveting, threaded-shaft and knurled-nut arrangement or the like attach the spring finger contacts to and support them on the baseplate 45. This entire slot arrangement, of course, is shown in fragmentary view only and would in fact be a portion of a data-processing equipment which would serve as the input point to the circuitry thereof. That is to say, the circuits to be described below in connection with the electrical operation of the card device make interconnection from any suitable data-processing system or equipment through the terminal blocks 47 and spring fingers 42 to the cross-shaped contact terminals 22 of the card so that the circuitry contained within the flat package 11 when the card is positioned in the slot in coupled relationship thereto becomes an active part of the circuitry of the data-processing equipment with which the slot 42 is associated.

This equipment could, for example, be a vending machine which has communication circuits connected to a central computer so that when the card is inserted into the slot and a control is actuated to indicate a purchase, the identification number or code key in the card will first be read and verified, the account of the proposed purchaser queried for balance, the purchase price posted to a given new balance and that balance entered both at the central computer and in a memory register in the card, if the system being used provides for one. Alternatively, of course, as described herein, the card may function simply as a key or identification system which may be used for admission at unattended gates, doors, or the like, or which may be used to query a central computer when a salesperson wishes to verify the credit balance of the user for purposes of cashing a conventional check. In such systems, the credit card would simply be placed in the appropriate slot and when the central data-processing apparatus identifies the code in the card, it would be programmed to read out back to the salesperson a credit authorization for the individual thus identified. Many other system uses are, of course, possible and it will be obvious that the circuit details of any particular system in all ramifications and complexity do not form a part of the present invention. In any of the systems, the unique identification and data processing available only by use of active electrical components within such a card is the essential feature.

It will be seen from FIGS. 4 and 5 that the flat package 11 within which the semiconductor wafer 10 is hermetically sealed and rigidly supported consists of a bottom member 13 which is preferably composed of an alloy known in the trade as "kovar," the composition of which is disclosed in the above-noted Buie case. The sidewalls 15 extending upwardly from the base 13 are provided with apertures containing insulating material such as a glass seal 13a which supports, seals, and insulates the lead conductors 16 which extend through these apertures in the side of the housing into the interior thereof. An adhesive layer 17 is provided on the top edge 18 of the sidewalls 15 so that a cover member 12 may be attached after the circuitry is secured inside the package. The cover member 12 as disclosed in the Buie case consists of a glass which may be rendered opaque by suitable painting or the like, but in the current application the cover member could also be metal, ceramic, or any other suitable material. Connection is made from the leads 16 to the circuit terminals of the circuitry in the wafer 10 by gold wire 21 in accordance with well-known techniques in the art. It is often desirable to provide a thin gold film 14 on the "kovar" package and a similar coating may, if desired, be provided on the leads 16. Although such flat packages are available with varying numbers of lead-in conductors, it will be seen from the block diagram of FIG. 6 and from the above-described card that only five conductors are need for the circuit of the present application.

Referring to the block diagram of FIG. 6, it will be observed that contact terminal 22a is connected by lead 16a to the power supply input terminals of all circuitry contained in a shift register 60, data processor 61 and gate 62 which may be fabricated in the integrated-circuit semiconductor wafer 10 as taught in the above-noted copending application of Grannis and Winkler with such interconnection modifications as will be described below. In general, there is disclosed in the Grannis and Winkler case a method for fabricating a basic digital cell comprising logical gate circuits and for connecting a plurality of cells to form flip-flops, shift registers, or any desired conventional data-processing circuit to provide functions of the type generally well known in the art in a highly efficient manner in very minute semiconductor circuitry.

As also shown in FIG. 6, the ground connection for these circuits is provided by terminal 22b which is connected by lead 16b to the ground point of the circuit which may preferably be the base 13 of the kovar housing. Input terminal 22d is adapted to receive a clock pulse from the associated data-processing equipment and to transmit this pulse over lead 16d to the shift register 60 and data processor 61. Similarly, terminal 22c is adapted to receive an initialize signal and any later data input signals which are transmitted over conductor 16c to the shift register 60 and data processor 61. Terminal 22e is adapted to receive the output signal from the shift register and/or data processor over conductor 16e to be transmitted back into the data-processing equipment via terminal 42e in the slot structure 42.

In operation, the card 30–31 is inserted into the slot 42 in the reading device so that the spring fingers 42a, etc., make electrical contact with the corresponding terminal 22a, etc., on the edge of the card. If desired, any suitable spring-and-latch arrangement may be provided to hold the card in position automatically. Power and ground connections are made by terminals 22a and 22b, respectively. Shortly after the power circuit is closed, the reader is programmed to generate and initialize a signal pulse which is received at terminal block 22c and applied over conductor 16c to the shift register to set the shift register to a predetermined code in a manner to be described below. This first initialize pulse is also applied by the data processor over conductor 16f to open normally closed gate circuit 62 for a time long enough to read the identification code serially out of the shift register 60. Thereafter, gate 62 is closed and input and output in any desired form are taken directly to and from the data processor.

In its simplest form, if the device is to be used only as a key or identification code, it may omit data processor 61 and gate 62. The entire "initialize" line 16c and its terminal would then be unnecessary if the associated equipment were provided with a suitable delay to read the shift register output only after the first few clock pulses have set the code into it in a manner to be described below.

In the embodiment shown in FIG. 6, a series of clock pulses are applied to terminal 22d after the "initialize" pulse and transmitted over conductor 16d to the shift register 60. This series of clock pulses causes the code pattern (which has previously been set into the shift register during manufacture) to step through it and to appear serially on the output line 16e and then via terminal 22e and contact 42e to the reader where it is sensed and compared with corresponding codes in the memory bank of the reader.

In order to achieve low production costs, the manufacturing techniques described in the above-referenced Grannis and Winkler application are preferably used to fabricate a shift register from a plurality of flip-flops on the silicon wafer 10. The standard digital cell of universal logic circuit applicability described therein is first fabricated and then an interconnect final metallization step is used to connect the cells in the configuration of a shift register comprising a plurality of serially connected flip-flop circuits. These flip-flops are indicated in FIG. 7 by the blocks marked FF-l, FF-2, FF-3, FF-4, FF-5, FF-6, which would make provision for a six-bit code. It will be noted from FIGS. 7 and 8 that each flip-flop has two inputs, a "set" input and a "zero" input, which, when pulsed, set the flip-flop to a "one" or a "zero" state, respectively. As is conventional, the presence of an output voltage may be taken to indicate a set or a value, and the absence of an output may be taken to indicate a zero value in commonly accepted binary notation. In the initial fabrication and connection of these microelectronic circuits, both of these inputs, that is the set input and zero input leads, are connected to line 16c which is the initialize signal line leading to terminal 22c. However, this portion of the interconnect metallization is formed so that each of these lines contains a deposited link of relatively low-melting point metal similar to a fuse. These low melting point segments are indicated in FIG. 7 as existing between points B-1 and C-1, D-1 and E-1, B-2 and C-2, D-2 and E-2, etc., for each flip-flop. After the circuit is fabricated, it is placed in a jig and a group of probes make contact with the circuit at point A and at point C-1, C-2... D-1, D-2... D-6, sequentially. A current greater than used in normal operation is then passed between the probe at point A and the probe at either point C-1 or D-1, between point A and between either point C-2 or D-2, and so on. This selectably directed large current vaporizes the unwanted link or connecting portion, leaving the other connector intact so that only the remaining connector actually receives and transmits the "initialize" pulse to one of the two inputs of the flip-flop. For example, if it were desired to set the code 010110 into the shift register, current would be passed between the terminal A and terminal C-1, D-2, C-3, D-4, D-5, and C-6, respectively. The result of passing such current is shown in FIG. 8 where the undesired links have been removed. This process of preestablishing the code in the shift register lends itself to automation and mass production, since individual shift registers can be moved automatically into and out of probe-operating positions in their jig carriers and the probe configuration can be automatically and sequentially programmed to change after each stepped operation of application to an individual shift register, thereby producing a plurality of differently coded cards.

Given the circuit configuration as shown in FIG. 8 wherein the identification code 010110 has been set into the register, it will be apparent that when the initialize pulse is first applied at terminal 22c, it sets flip-flop FF-1 to the zero state because this pulse can reach that only over the zero line. Thereafter, when a train of clock pulses equal in number to the number of flip-flops in the shift register is applied at terminal 22d, the state of each register is serially shifted to the right and appears at the output line 16e to give a readout of the identification code which has been preestablished in the wiring of the register. As noted above, where a data processor 61 is also included, gate 62 is closed after the identification code is thus read out. If only a key card is desired, line 16c, processor 61, and gate 62 can be omitted and a suitable delay provided in the reader. After the first few clock pulses are applied, the shift register will go from a random state to the present code configuration which will then be cyclically repeated in its output.

With more sophisticated circuitry using a four-phase clock type of shift register, it would be possible to have only one input signal which could be AC-coupled to the card from the reader. This signal would consist of a pulse train. The initialize and clock signals, as well as the power necessary to operate the logic, would be derived from the pulse train internally to the card. Such a circuit arrangement would permit either capacitive or inductive coupling of the card to the reader and would eliminate the necessity for physical electrical contacts.

Alternatively, a light beam falling on a photocell in the card could provide input and a photodiode in the card could provide output. The elimination of the mechanical contact would tend to eliminate one possible source of mechanical failure, but the device would otherwise function in an identical manner.

More importantly, it should be understood that although the card disclosed herein contains only a relatively simple circuit making provision for a six-bit binary identification code, far more complex circuitry can very easily be included either within a single flat pack as shown or by adding additional flat packs in parallel or series, if necessary. In addition to ready provision of all of the circuit functions shown and described, for example, in the Grannis and Winkler application, virtually any data-processing or logic function can be included in such a card. Thus, if desired, a magnetic core planar memory array of miniaturized size can also be embedded between the two laminar sheets so that the active element of the logic circuits can read into and out of the card's own memory as may be required by the particular application. It should also be understood that magnetic logic elements which are recognized equivalents for purely electrical flip-flops could also be used. In any such arrangement, however, it is essential to the achievement of the unique advantages of the present invention, to utilize active elements requiring electrical or electromagnetic power and signal transmission into and out of the card as distinguished from passive electrical elements or magnetic field responsive elements. The disadvantage of such passive elements lie not only in the relatively restricted complexity of their possible operation, coding, and the like, but also in their susceptibility to nondestructive analysis by external means thereby permitting surreptitious counterfeiting. Thus, if the card were to contain merely magnetic numerals or characters such as are commonly used for coding checks for automatic data-processing equipment, anyone could readily read the magnetic pattern with a magnetically responsive device even if it were laminated inside the card. In the present device, on the other hand, only a user knowing the exact manner of functioning of the device and having relatively complex mating digital apparatus can read the code out of the card. Even this type of readout is not meaningfully possible unless the inner circuit structure is understood or reverse engineered. Such analysis of the inner circuit structure is, of course, only possible by destruction of the laminated card and removal of the flat pack from the card for inspection.

Variations on the relatively simple circuitry disposed herein will be readily apparent to those skilled in the cryptographic arts whereby a meaningful output signal is not derivable even when obviously proper electrical connections are made except in response to a coded "initialize" pulse, the code for which would be known only to the individual manufacturer and issuer of the card. Such a code could, for example, control the gate 62 to permit user code readout from an individual shift register only after the standard gate-opening pulse code common to all cars issued by that user has first been applied.

In any of the above-discussed variations or alternative embodiments it will be noted that the card still functions as a coupled active component in an automatic data-processing system and thereby gains the advantages discussed above. Thus, while a specific preferred embodiment of the invention has been described by way of illustration only, it will be understood that the invention as suggested is capable of many other specific embodiments and modifications and is defined solely by the following claims.

I claim:

1. An active electrical card device for a data-processing system comprising:
   a card adapted to be carried by an individual user, said card having at least one beveled edge, and shaped to mate in one position only with a receiving means included in said data-processing system, said receiving means having a beveled edge complementary to that of said card, in virtue of which the card is received in only one position;

first circuit means for providing a unique identifying code for said card;

second circuit means for performing predetermined data-processing functions;

said first and second circuit means being integral with said card and including at least one active element; and said card including means connected to said first and second circuit means to receive and transmit energy and signal information from and to said data-processing system when said card is placed in coupled relationship with said system so as to place said first and second circuit means in operative relationship as active components of said system.

2. Apparatus as in claim 1 wherein said card is composed of a cyclized highly cross-linked polydiene resin which when cured is characterized as a hard, stiff, chemically stable resin having a high dielectric strength.

3. Apparatus as in claim 2 wherein said card comprises upper and lower sheet members of said resin laminated together with said circuit means embedded between said laminated sheets.

4. Apparatus as in claim 1 wherein said coupling means comprises contact terminal block members laminated in notches found along one side of said card.

5. Apparatus as in claim 1 wherein said circuit means also includes means for providing a predetermined data-processing function.

* * * * *